J. Buchanan.
Broom Head.
Nº 51,013. Patented Nov. 21, 1865.
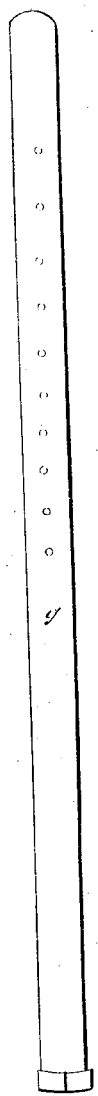
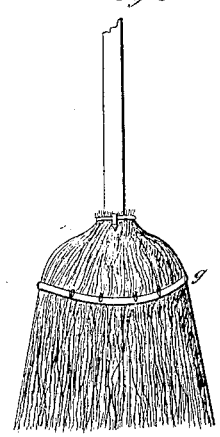
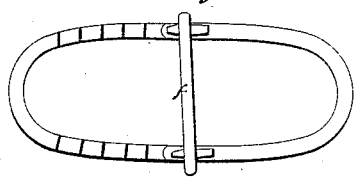
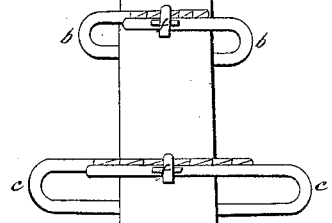
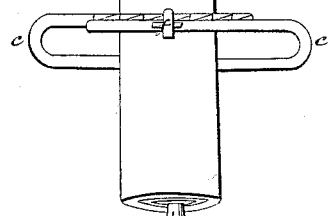
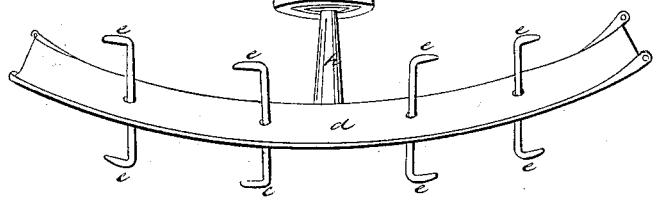
Witnesses
R. E. McCreary
E. H. Davis
Inventor
John Buchanan

UNITED STATES PATENT OFFICE.

JOHN BUCHANAN, OF AURORA, INDIANA.

BROOM-HEAD.

Specification forming part of Letters Patent No. 51,013, dated November 21, 1865.

*To all whom it may concern:*

Be it known that I, JOHN BUCHANAN, of Aurora, in the county of Dearborn and State of Indiana, have invented new and useful Improvements on Broom-Heads; and I do hereby declare that the following is a full and exact description, reference being had to the accompanying drawings, and to the letters of reference thereon.

The nature of my invention consists in providing a metallic fastening in part for the straw or brush to the handle of the broom in such a manner that it requires but a few ounces of metal in its construction, the greater portion of which is covered or concealed by the brush of the broom, thereby almost preventing any liability to bruise furniture in sweeping, and can be used for holding or fastening any number of brooms by refilling with new brush.

To enable others skilled in the art to make and use my invention, I will proceed to describe its construction and operation.

I construct my broom-head by inserting into a common broom-handle, about two inches from the end, the collar-plate $f$, (shown in Figure 5 in the accompanying drawings. Through the collars of this plate pass two sliding or adjustable staples, $c\ c$, Fig. 1. About one and a half inch above these are attached to the handle in the same manner a similar plate and staples $b\ b$. In the end of the handle I fasten, by a shank, $h$, a curved plate, $d$, containing four or more hooked teeth, $e$, upon each side.

In order to make a broom on this broom-head, I first extend the staples $c\ c$, as shown in Fig. 2; then fill them with the straw, placing one-half of it on each side of plate $d$; then force them as nearly together as is necessary, as shown in Fig. 1, and secure their position by wedges inserted into the collar; I next fill and fasten staples $b\ b$ in like manner. I then draw strap $g$, Fig. 4, over the ends of plate $d$ and secure it under the hooks $e\ e$, as shown in Fig. 3.

What I claim as my invention, and desire to secure by Letters Patent, is—

The combination of the notched adjustable staples $b\ b$ and $c\ c$, with their collar-plates $f\ f$, the curved plate $d$, with its hooks $e\ e$, and the strap $g$, all for the purpose as herein set forth and described.

JOHN BUCHANAN.

Witnesses:
R. E. McCREARY,
E. H. DAVIS.